US012566912B2

(12) United States Patent
Zhang et al.

(10) Patent No.: US 12,566,912 B2
(45) Date of Patent: Mar. 3, 2026

(54) PAGE JUMPING METHOD, APPARATUS, AND DEVICE, AND STORAGE MEDIUM AND PROGRAM PRODUCT

(71) Applicant: Beijing Zitiao Network Technology Co., Ltd., Beijing (CN)

(72) Inventors: Shuang Zhang, Beijing (CN); Lin Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/235,683

(22) Filed: Aug. 18, 2023

(65) Prior Publication Data

US 2023/0394223 A1     Dec. 7, 2023

Related U.S. Application Data

(63) Continuation of application No. PCT/CN2022/119642, filed on Sep. 19, 2022.

(30) Foreign Application Priority Data

Sep. 22, 2021     (CN) .......................... 202111109230.8

(51) Int. Cl.
 *G06F 40/134*          (2020.01)
 *G06F 3/04815*         (2022.01)
(52) U.S. Cl.
 CPC ........ *G06F 40/134* (2020.01); *G06F 3/04815* (2013.01)
(58) Field of Classification Search
 None
 See application file for complete search history.

(56) References Cited

U.S. PATENT DOCUMENTS 9,311,618 B2 *  4/2016  Lieb ........................ G06Q 10/10
9,411,789 B1 *  8/2016  Chitta ................ H04N 21/8543
(Continued)

FOREIGN PATENT DOCUMENTS

CN          103955501 A      7/2014
CN          104753973 A      7/2015
(Continued)

OTHER PUBLICATIONS

International Patent Application No. PCT/CN2022/119642; Int'l Search Report; dated Dec. 14, 2022; 3 pages.
(Continued)

*Primary Examiner* — Howard Cortes
(74) *Attorney, Agent, or Firm* — BakerHostetler

(57)          ABSTRACT

Disclosed in embodiments of the present disclosure are a page jumping method, apparatus, and device. The method comprises: in response to a first operation on a target document link in a real-time interaction interface, acquiring a target document address corresponding to the target document link, the target document link being nested in a current document, and the current document being a shared document displayed in the real-time interaction interface; and presenting the current document in the real-time interaction interface, and displaying the target document on the basis of the target document address. According to the technical solution provided by the present disclosure, in an audio/video conference, a sharer and a sharee can quickly operate the link of the target document to quickly open the link nested in the current document, such that a user can conveniently and simultaneously access the current shared document and the target document.

20 Claims, 3 Drawing Sheets

Talking

Permission setting          Stop sharing

XXXXXXXXXXXXXXXXX
XXXXXXXXXXXXX
Target document link

(56) References Cited

U.S. PATENT DOCUMENTS

| | | | |
|---|---|---|---|
| 2010/0077319 A1* | 3/2010 | Xu | G06Q 10/10 |
| | | | 715/753 |
| 2013/0007579 A1* | 1/2013 | Dancy | G06Q 50/01 |
| | | | 715/205 |
| 2014/0139614 A1 | 5/2014 | Swanson et al. | |
| 2014/0267167 A1* | 9/2014 | Ricks | G06F 1/3231 |
| | | | 345/173 |
| 2015/0012270 A1* | 1/2015 | Reynolds | G10L 25/87 |
| | | | 704/233 |
| 2015/0058407 A1 | 2/2015 | Uhma et al. | |
| 2015/0112927 A1* | 4/2015 | Lee | G06F 16/178 |
| | | | 707/610 |
| 2015/0134722 A1* | 5/2015 | Marshall | H04L 63/08 |
| | | | 709/203 |
| 2016/0065625 A1* | 3/2016 | Ouyang | H04L 65/4038 |
| | | | 715/753 |
| 2016/0330268 A1 | 11/2016 | Feng | |
| 2019/0065595 A1 | 2/2019 | Cain et al. | |
| 2019/0065601 A1* | 2/2019 | Cain | G06F 16/951 |
| 2019/0228079 A1 | 7/2019 | Kyte et al. | |
| 2021/0097125 A1* | 4/2021 | Khanna | H04L 67/02 |
| 2021/0133270 A1* | 5/2021 | Moyal | G06F 16/94 |
| 2022/0374590 A1* | 11/2022 | Seth | G09B 5/06 |

FOREIGN PATENT DOCUMENTS

| | | | |
|---|---|---|---|
| CN | 105282480 A | 1/2016 | |
| CN | 107786832 A | 3/2018 | |
| CN | 109819340 A | 5/2019 | |
| CN | 112311754 A | 2/2021 | |
| CN | 112462954 A | 3/2021 | |
| CN | 113014857 A | 6/2021 | |
| CN | 113741765 A | 12/2021 | |
| JP | 2000-152201 A | 5/2000 | |
| JP | 2016-517082 A | 6/2016 | |
| JP | 2017-503270 A | 1/2017 | |
| JP | 2017-130202 A | 7/2017 | |
| JP | 2020-149689 A | 9/2020 | |
| JP | 2020-531998 A | 11/2020 | |
| JP | 2021-072070 A | 5/2021 | |

OTHER PUBLICATIONS

Japan Patent Application No. 2023-549012; Refusal Reason Notice; dated Oct. 1, 2024; 8 pages.

Written Opinion for International Application No. PCT/CN2022/119642, mailed Dec. 14, 2022, 9 Pages.

* cited by examiner

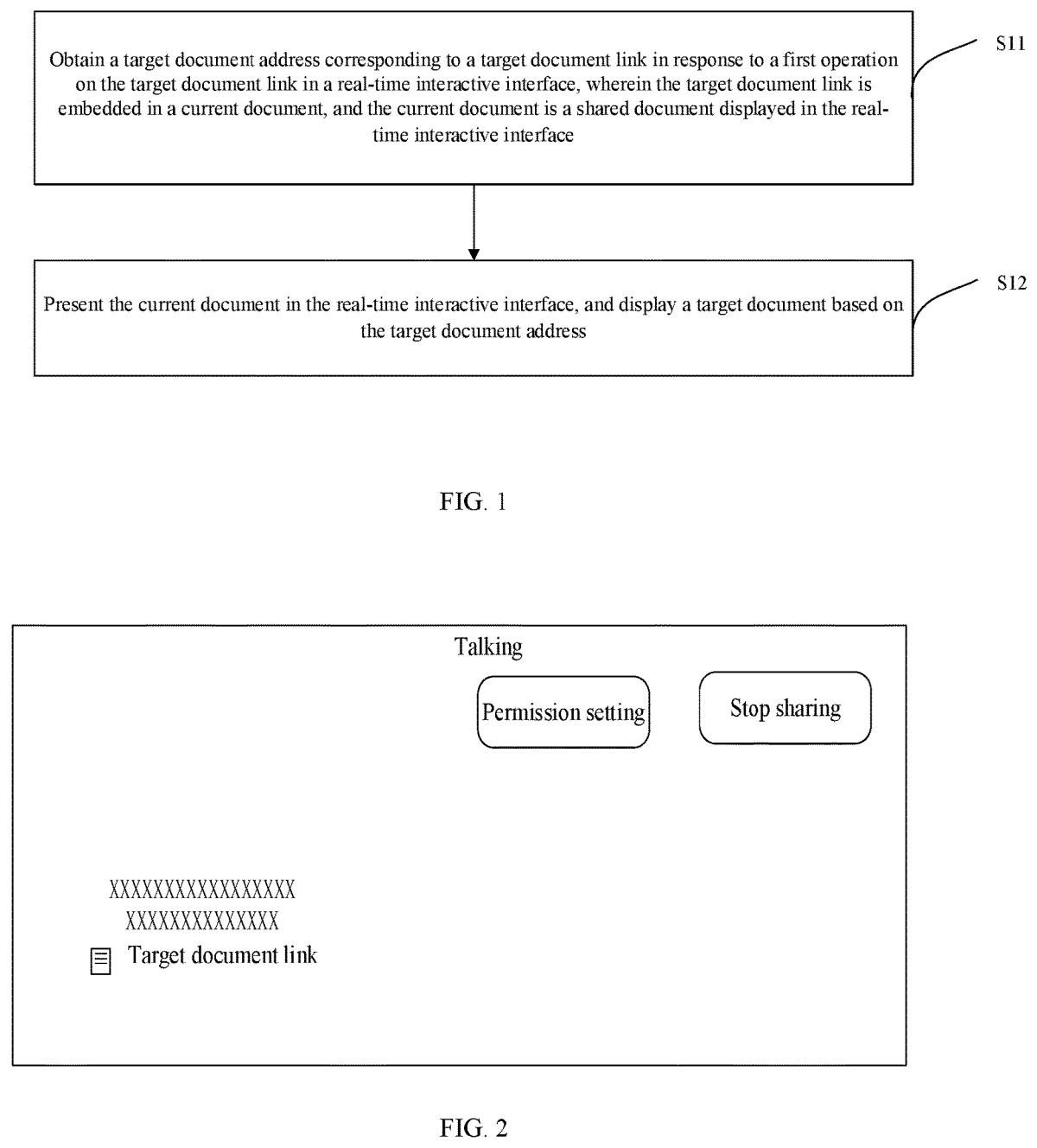

Obtain a target document address corresponding to a target document link in response to a first operation on the target document link in a real-time interactive interface, wherein the target document link is embedded in a current document, and the current document is a shared document displayed in the real-time interactive interface

S11

Present the current document in the real-time interactive interface, and display a target document based on the target document address

Talking

Permission setting

Stop sharing

XXXXXXXXXXXXXXXXX
XXXXXXXXXXXXXX

Target document link

FIG. 2

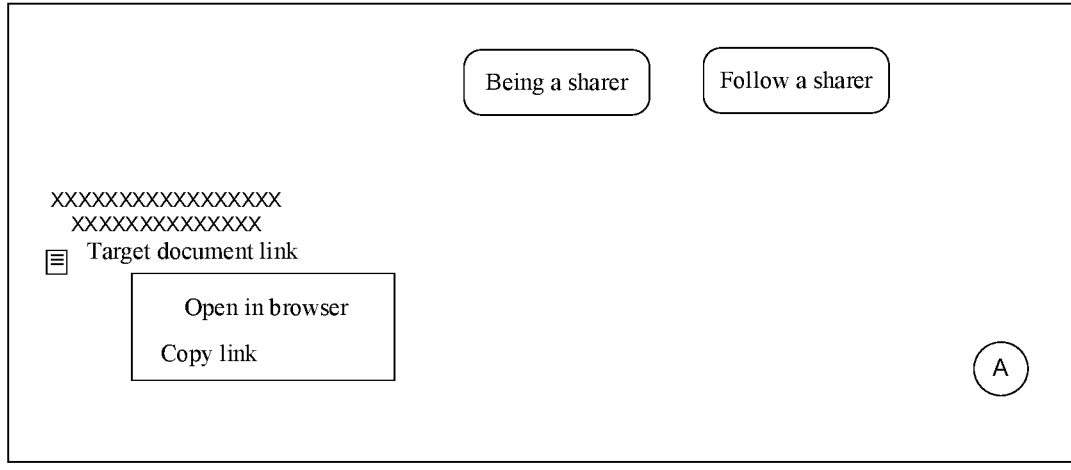

FIG. 3

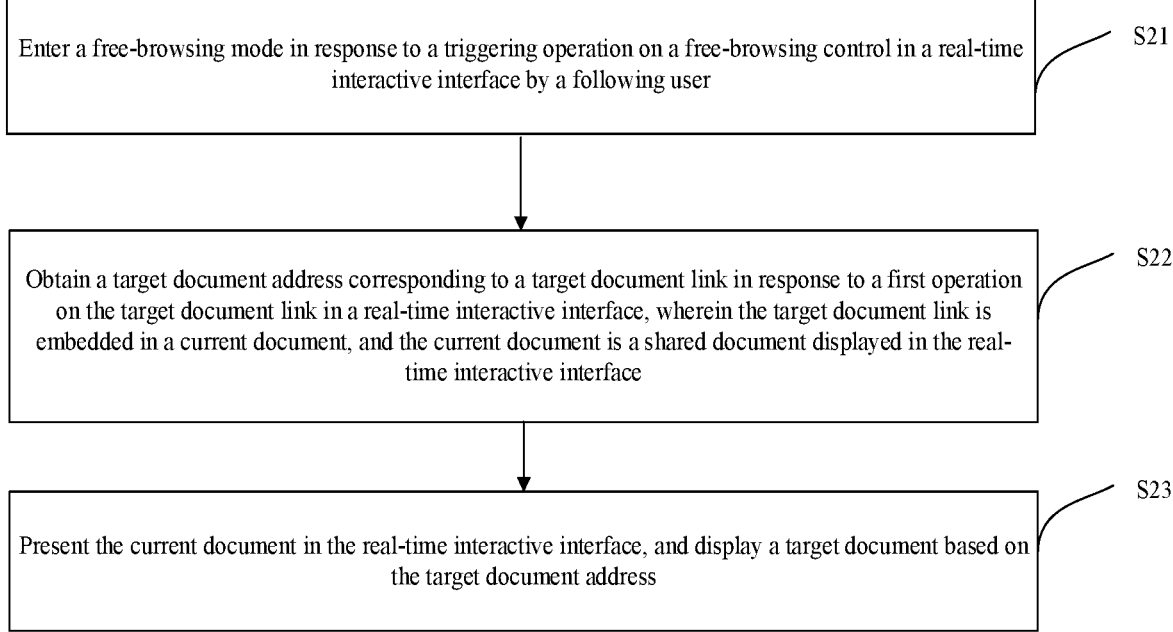

Enter a free-browsing mode in response to a triggering operation on a free-browsing control in a real-time interactive interface by a following user — S21

Obtain a target document address corresponding to a target document link in response to a first operation on the target document link in a real-time interactive interface, wherein the target document link is embedded in a current document, and the current document is a shared document displayed in the real-time interactive interface — S22

Present the current document in the real-time interactive interface, and display a target document based on the target document address — S23

PAGE JUMPING METHOD, APPARATUS, AND DEVICE, AND STORAGE MEDIUM AND PROGRAM PRODUCT

CROSS REFERENCE

The disclosure is a continuation application of International Application No. PCT/CN2022/119642, titled "PAGE JUMPING METHOD, APPARATUS, AND DEVICE, AND STORAGE MEDIUM AND PROGRAM PRODUCT", filed on Sep. 19, 2022, which claims the priority of the Chinese patent application No. 202111109230.8, filed on Sep. 22, 2021, titled "PAGE JUMPING METHOD, APPARATUS, AND DEVICE, AND STORAGE MEDIUM AND PROGRAM PRODUCT", the entire contents of both of which are incorporated herein by reference.

TECHNICAL FIELD

The present disclosure relates to the field of information technology, particularly relates to a page jumping method, apparatus and device and storage medium and program product.

BACKGROUND

With the continuous development of Internet technology, more and more users use functions of terminals to make life and work more convenient. For example, a user initiates a remote audio/video conference with other users via a terminal device. Interaction between users through online audio/video conference avoids the limitations of a conventional face-to-face conference on places and venues, so that the users do not have to be gathered in one place to start a conference.

In an audio/video conference, documents may be shared through the terminal device, and various operations may be performed on the shared documents in order to improve the communication experience of the users. However, in the prior art, documents are operated in a single manner, and the overall links embedded in the shared documents are long and complex in process when being opened.

SUMMARY

In order to solve the above technical problems or at least partially solve the above technical problems, embodiments of the present disclosure provide a page jumping method, apparatus and device and storage medium and program product to quickly open a link embedded in a shared document.

In a first aspect, an embodiment of the present disclosure provides a page jumping method, including:

obtaining a target document address corresponding to a target document link in response to a first operation on the target document link in a real-time interactive interface, wherein the target document link is embedded in a current document, and the current document is a shared document displayed in the real-time interactive interface; and presenting the current document in the real-time interactive interface, and displaying a target document based on the target document address.

In a second aspect, an embodiment of the present disclosure provides a page jumping apparatus, including:

an operation response module, configured to obtain a target document address corresponding to a target document link in response to a first operation on the target document link, wherein the target document link is embedded in a current document, and the current document is a shared document displayed in the real-time interactive interface; and a page jumping module, configured to present the current document in the real-time interactive interface, and display a target document based on the target document address.

In a third aspect, an embodiment of the present disclosure provides a page jumping device, wherein the terminal device includes:

one or more processors;

a storage device, configured to store one or more programs;

the one or more programs, when executed by the one or more processors, cause the one or more processors to implement the above any page jumping method in the first aspect.

In a fourth aspect, an embodiment of the present disclosure provides a computer-readable storage medium, storing a computer program thereon, wherein the program, when executed by a processor, implements the above any page jumping method in the first aspect.

In a fifth aspect, an embodiment of the present disclosure provides a computer program product, including a computer program or an instruction, wherein the computer program or the instruction, when executed by a processor, implements the above any page jumping method in the first aspect.

The technical solutions provided by the embodiments of the present disclosure, compared with the prior art, have the advantages as follows: the embodiments of the present disclosure disclose a page jumping method, apparatus and device, a storage medium and a program product. The method includes: obtaining a target document address corresponding to a target document link in response to a first operation on the target document link in a real-time interactive interface, wherein the target document link is embedded in a current document, and the current document is a shared document displayed in the real-time interactive interface; and presenting the current document in the real-time interactive interface, and displaying a target document based on the target document address. According to the present disclosure, a user may access the current shared document and the target document at the same time by allowing a sharer and a participator to quickly open a link embedded in the current document by performing a shortcut operation on the target document link in an audio/video conference.

BRIEF DESCRIPTION OF THE DRAWINGS

Combined with the accompanying drawings and referring to the following specific embodiments, the above and other features, advantages and aspects of each embodiment of the present disclosure will become more obvious. Throughout the drawings, identical or similar drawing markings indicate identical or similar elements. It should be understood that the drawings are schematic and that the originals and elements are not necessarily drawn to scale.

FIG. 1 is a flowchart of a page jumping method in an embodiment of the present disclosure;

FIG. 2 is a schematic diagram illustrating document link nesting provided by an embodiment of the present disclosure;

FIG. 3 is a schematic diagram of a first display box after right-clicking provided by an embodiment of the present disclosure;

FIG. 4 is a flowchart of a page jumping method in an embodiment of the present disclosure;

DETAILED DESCRIPTION OF PREFERRED EMBODIMENTS

Figure 5:
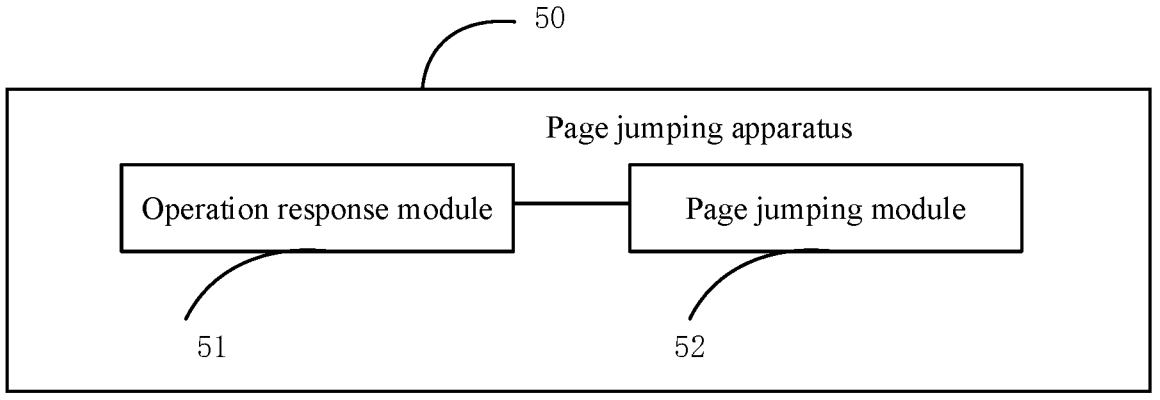
FIG. 5 is a structural schematic diagram of a page jumping apparatus in an embodiment of the present disclosure.

Embodiments of the present disclosure will be described in more detail below with reference to the accompanying drawings. Although certain embodiments of the present disclosure are shown in the drawings, it should be understood that the present disclosure may be achieved in various forms and should not be interpreted as being limited to the embodiments described herein, but rather provided for a more thorough and complete understanding of the present disclosure. It should be understood that the drawings and embodiments of the present disclosure are for exemplary purposes only and are not intended to limit the scope of protection of the present disclosure.

It should be understood that the steps described in the embodiments of the methods described in the present disclosure may be performed in different sequences, and/or in parallel. Further, method embodiments may include additional steps and/or omit the steps shown. The scope of this disclosure is not limited in this respect.

The term "including" and its variations herein as used herein are open-ended including, i.e. "including but not limited to". The term "based on" is "at least partially based on". The term "one embodiment" means "at least one embodiment"; the term "another embodiment" means "at least one additional embodiment"; The term "some embodiments" means "at least some embodiments". The definitions of other terms are given in the description below.

It should be noted that the concepts of "first", "second" and so on referred to in the present disclosure are only used to distinguish different devices, modules or units, and are not used to limit the order or interdependence of the functions performed by these devices, modules or units.

It should be noted that references to "one", "multiple" modifications in the present disclosure are indicative rather than restrictive, and those skilled in the art should understand that unless otherwise expressly indicated in the context, should be understood as "one or more".

The names of messages or information exchanged between multiple devices in the present public embodiment are for illustrative purposes only, and are not used to limit the scope of these messages or information.

With the continuous development of Internet technology, various parties in real-time interaction may utilize the Internet for real-time transmission and interaction of data when there is a demand for the real-time interaction. For example, users may interact through an online audio/video conference, which avoids the limitations of a conventional face-to-face conference on places and venues, so that the users do not have to be gathered in one place to start a conference.

An audio/video conference refers to the remote communication of voice, image and document data through a conference room hardware device or an end-user software body, in addition to the integration of other applications to achieve immediate and interactive communication, which provides users with high-definition, efficient, high-quality conferencing experience, and solves the problem of conferencing costs due to spatial distance.

To improve the user communication experience, documents desired to be shared may be presented in a real-time interactive interface in an audio/video conference. For example, content presented on a certain user terminal participating in a conference may serve as a video stream to be shared to other client sides participating in the conference by means of screen sharing. Alternatively, for content that attending users may access through an access address (e.g., a shared document stored in the cloud), the access address may be shared among the attending users such that the attending users access the access address at their own client side interfaces to obtain the corresponding shared content.

In an audio/video conference scenario, there may be a shared document embedded in the current shared document (i.e., the shared document being presented by the user for making presentation in the audio/video conference). Moreover, there are some needs that following users (e.g., other attending users other than the current presenter user in the audio/video conference) expect to open and access the shared document embedded therein while following the presenter user to view the current shared document.

In response to the above-mentioned needs, the embedded shared document may only be opened directly within a conferencing window to jump from the current shared document to the embedded shared document in the related technology. As thus, if the following users want to follow the presenter user to view the current shared document and access the shared document embedded therein at the same time, it is required to jump to the embedded shared document within the conferencing window to obtain the access address of the embedded shared document and access the embedded shared document outside a client side (e.g., in a browser), and then return to the conferencing window to follow the presenter's presentation of the current shared document. In this way, it will result in that the opening process of the overall document link embedded in the shared document is long and complex.

In view of this problem, an embodiment of the present disclosure provides a page jumping method by which the embedded document link is simultaneously opened in the shared document without changing the current shared document presented in the conferencing interface. The method is described below in combination with specific embodiments.

FIG. 1 is a flowchart of a page jumping method in an embodiment of the present disclosure, which is applicable to a case of page jumping in a client side. The method may be performed by a page jumping apparatus, the page jumping apparatus can be implemented in a software and/or hardware manner. The page jumping apparatus may be configured in a terminal device, such as a terminal, specifically including but not limited to a smartphone, a palmtop computer, a tablet computer, a wearable device with a display screen, a desktop computer, a notebook computer, an all-in-one computer, a smart home device, etc. Alternatively, the embodiment may be applied to a case of page jumping in a server side. The page jumping method may be performed by a page jumping apparatus that may be implemented in a software and/or hardware manner, and may be configured in a terminal device, such as a server.

As shown in FIG. 1, the page jumping method provided by the embodiment of the present disclosure mainly includes the following steps:

S11: A target document address corresponding to a target document link is obtained in response to a first operation on the target document link in a real-time interactive interface, wherein the target document link is embedded in a current document, and the current document is a shared document displayed in the real-time interactive interface.

A target document refers to a document that a current user wants to open in the real-time interactive interface, and the current document refers to a document that the current user is displaying in the real-time interactive interface. The target document link may be understood as a hyperlink in which the target document is embedded in the current document. The current document may have an arbitrary format, such as a document, a form, a presentation document, a mindnote, etc. The target document may also have an arbitrary format, and may also be a word document, an excel form, a powerpoint document, a mindnote, a web page, an electronic mailbox, an applet, or other contents. The format of the current document may be the same as or different from the format of the target document, and the type of the current document may be the same as or different from the type of the target document, which may not be limited in the embodiment. The current document may be opened using an application installed in an electronic terminal, and the above application may be either a document application or a browser. It should be noted that the current document and the target document may be accessed through addresses stored in the cloud, and the addresses stored in the cloud include URL addresses.

Optionally, the current document is a document being shared by the user through the real-time interactive interface during the audio/video conference. Any one of the users participating in the audio/video conference through the real-time interactive interface, including a sharer and participators, may browse the current document. The sharer is a user who shares the document in the real-time interactive interface, and the participators are users other than the sharer participating in the audio/video conference through the real-time interactive interface.

FIG. 2 is a schematic diagram illustrating document link nesting provided by an embodiment of the present disclosure. As shown in FIG. 2, this page is that a sharer is sharing a current document, and a target document link is saved in the shared document. The target document link is displayed in a manner different from that of other document contents when the current document is displayed. The target document link may be displayed differently from other document contents in a particular font, or a particular color, to prompt the users that there is an operable link. Further, when the other document contents are in a first color, the document link may be in a second color, wherein the first color and the second color are different. For example, the document link may be blue when other document contents are black. It should be noted that FIG. 2 is only an example, and multiple document links may exist in a shared document.

In the embodiment, the first operation on the target document link may be a clicking operation on the target document link, may be an operation on a control corresponding to the target document, or may be a combination of a control and the clicking operation. Further, the first operation may be that a menu displayed after the target document link is clicked, and the menu may be operated again. In this embodiment, only the first operation on the target document link is described, but not limited.

In an embodiment, the first operation is obtained by a control device electrically connected to a terminal device, and the terminal device generates a preset control instruction from the first operation acting on the control device. Then, the preset control instruction is remotely transmitted to the terminal device in a remote transmission manner. The target document address corresponding to the target document link is obtained after a browser on the terminal device receives the preset control instruction. The remote transmission manner includes a computer network communication transmission manner based on a TCP/IPUDP protocol and a near-range wireless transmission manner based on Bluetooth, and infrared transmission standards.

Optionally, the control device is a remote controller or a mouse wirelessly connected to the terminal device, and the control device is used to remotely transmit the control instruction to the terminal device to control the terminal device to perform a corresponding operation when it is inconvenient for the user to control the terminal device at close range. In addition, the control device may also be an acquisition unit configured to acquire a gesture operation to generate a preset control instruction, for example, the acquisition unit triggers the preset control instruction by acquiring the gesture operation acting on an application controlling the terminal device on a mobile terminal, and then transmits the present control instruction to the terminal device.

In another embodiment, the first operation is triggered by a preset action acting on a current shared document in the real-time interactive interface, and the terminal device is equipped with a touch screen (also referred to as "touch control screen", or "touch panel") configured to receive input signals. A haptic feedback system on a screen of the terminal device may drive various linking devices according to a pre-programmed program when the touch screen receives the first operation acting on the touch screen. In the embodiment, the terminal device triggers the preset control instruction by receiving the preset action acting on the current shared document in the real-time interactive interface, and the real-time interactive interface displays the target document based on the target document address in response to the control instruction.

It should be noted that a second operation, a third operation, a fourth operation, and a fifth operation described below may employ any one of the above input manners, and will not be described in detail in the following embodiments.

The target document address may be a physical address at which the documents are stored, or may be a web page address based on a hypertext transfer protocol, which is not limited in the embodiment.

S12: The current document is presented in the real-time interactive interface, and the target document is displayed based on the target document address.

In the embodiment, after jumping to a page corresponding to the target document address, the page becomes a new current displayed page and the target document is displayed. The new current displayed page may be a page in the application displaying the current document or a page in a third-party application, which is not limited in the embodiment.

In one embodiment, the step that the current document is presented in the real-time interactive interface, and the target document is displayed based on the target document address includes: jumping to a third-party browser to display the target document in a page of the third-party browser based on the target document address.

The above third-party browser refers to a browser application installed in the terminal device, and the type of the third-party browser is not limited in the embodiment.

In one embodiment, the target document may be opened within a client side or outside the client side. If the target document is opened within the client side, the current document and the target document may be presented simultaneously in the real-time interactive interface. On the other hand, if the target document is opened outside the client side, the current document may be opened in the real-time inter-active interface while the target document is presented in the third-party browser.

In the embodiment, the above target document address may be selected to be a web page address based on a hypertext transfer protocol, and it jumps from the current page to the third-party browser after the target document address is obtained.

Further, the current page displays the installed browser in the terminal device for selection by the user before jumping to the third-party browser, and the third-party browser that needs to be jumped is determined based on the selection by the user. If the third-party browser is not installed in the terminal device, the user may be prompted to download the third-party browser.

In the embodiment, the third-party browser reads the target document stored in the address according to the target document address and displays the target document in the page of the third-party browser.

An embodiment of the present disclosure discloses a page jumping method includes the following steps: a target document address corresponding to a target document link is obtained in response to a first operation on the target document link in a real-time interactive interface, wherein the target document link is embedded in a current document, and the current document is a shared document displayed in the real-time interactive interface; and a target document is displayed in a current page based on the target document address. According to the present disclosure, a user may access the current shared document and the target document at the same time by allowing a sharer and a participator to quickly open a link embedded in the current document by performing a shortcut operation on the target document link in an audio/video conference.

In one embodiment, the step that the target document address corresponding to the target document link is obtained in response to the first operation on the target document link in the real-time interactive interface includes: obtaining the target document address corresponding to the target document link in response to an triggering operation on a preset control.

In the embodiment, the preset control refers to a key having a shortcut function provided on an input device externally connected to a terminal device.

Optionally, the triggering operation in a shortcut case in the embodiment mainly includes that the user left-clicks the target document link while operating a control of an input device (e.g., keyboard). The selection of controls on the keyboard may be set according to the actual usage habits of the user. The control in the embodiment is optionally Ctrl/Command.

In the embodiment, the triggering operation on the control is implemented by custom-made kernel codes. For the function of opening the document link by shortcut+left-clicking, the action is recognized in the kernel to open a page in a new tab, save a link to a page to be opened, and intercept a subsequent default action to open the link in a third-party browser instead.

In the embodiment, it jumps to the third-party browser after pressing the control and meanwhile left-clicking the target document link, and the target document is displayed at the third-party browser. On the one hand, there is no need to click the target document in a conferencing window to obtain the target document link, and then open the target document using the browser. On the other hand, if it is desired to follow a presentation action of a presenter on the current shared document, there is no need to perform the tedious process of returning to follow the document that a sharer is sharing after returning to the conference. Moreover, the document link embedded in the shared document is rapidly opened without affecting the state that the sharer and the participator perform following during sharing.

In one embodiment, obtaining a target document address corresponding to a target document link in response to a first operation on the target document link comprises: displaying a first display box in response to a second operation on the target document link; obtaining a target document address corresponding to the target document link in response to a triggering operation of an open control in the first display box, and performing an operation of displaying the target document based on the target document address.

In the embodiment, the above second operation is option-ally a right-clicking operation of a mouse, and also a key, which implements a right-clicking function, of a touch panel.

A first display box may be, for example, a menu display box. As shown in FIG. 3, the first display box may include, for example, two types of operations: "open in browser" and "copy link".

The opening operation in the first display box may be understood as a triggering operation on a key for "open in browser" in the first display box, and the above triggering operation may be a left-clicking operation of the mouse, a right-double-clicking operation of the mouse, a right-click-ing operation of the mouse, or the like.

In the embodiment, in response to the triggering operation of the key for "open in browser" in the first display box, the step of jumping to the third-party browser is performed, and the target document is displayed at the third-party browser so that the target document link may be obtained and the target document is displayed on the premise of maintaining display of the shared document being presented by the presenter in the audio/video conferencing window.

In one embodiment, after the first display box is displayed in response to the second operation on the target document link in the real-time interactive interface, and the target document address corresponding to the target document link is obtained in response to the triggering operation on the open control in the first display box, the page jumping method includes the following steps: the target document address corresponding to the target document link is obtained in response to a triggering operation of a copy control in the first display box, and the target document address is copied to a clipboard.

In the embodiment, for the function of right-clicking the document link to open the document, a link of the current clicking location is obtained through the support of the kernel of the browser, and a menu implemented based on a native UI is overlaid on a Web page to let the user select subsequent actions.

The triggering operation of a copy control in the first display box may be understood as a triggering operation on a key for "copy link" in the first display box, and the above triggering operation may be a left-clicking operation of the mouse, a double-clicking operation, a right-clicking opera-tion of the mouse, or the like.

In the embodiment, the document address corresponding to the target document link is copied to the clipboard in response to the triggering operation of the key for "copy link" in the above first display box, so as to fast copy the document address, avoiding the tedious operation of copy-ing the document address again after the real-time interac-tive interface is opened in the shared document.

In one embodiment, the step that the target document address corresponding to the target document link is obtained in response to the first operation on the target document link in the real-time interactive interface includes: determining, in response to the first operation on the target document link in the real-time interactive interface, location information corresponding to the first operation; determining the target document address corresponding to the target document link based on the location information.

In the embodiment, the above location information refers to location information of the target document link in the real-time interactive interface. A corresponding relationship between the location information and the document address is stored in advance. A document address corresponding to the location information is queried after the location information corresponding to the first operation is obtained, and the document address is taken as the target document address.

FIG. 4 is a flowchart of another page jumping method provided by an embodiment of the present disclosure. As shown in FIG. 1, the page jumping method provided by the embodiment of the present disclosure mainly includes the following steps:

S21: A free-browsing mode is entered in response to a triggering operation on a free-browsing control in a real-time interactive interface by a following user participating in real-time interaction.

In the free-browsing mode, the following user has a browsing operation permission to a shared document presented in the real-time interactive interface independent of a presenter for a current document.

The current presenter is a user presenting the current shared document. A sharer and the presenter may be one user or different users. If a participator is in a following state, the document shared by the sharer and the operation on the shared document by the presenter are displayed in the real-time interactive interface.

The following user and the current presenter share a page content of the real-time interactive interface. It should be noted that the current presenter may become a following user through a triggering operation, and the following user may also become a current presenter through a triggering operation.

The free-browsing mode means that the following user may operate and process the page content on the real-time interactive interface voluntarily. The above free-browsing mode is with respect to a following mode. The following mode means that a real-time interactive interface for the following user and a real-time interactive interface for the current presenter display the same content, and the operation on the document by the current presenter is followed, and operation steps and various functions implemented by the operation are displayed.

Further, in the free-browsing mode, an identification configured to indicate a presentation location of the current presenter is presented on the real-time interactive interface for the following user. The identification of the above presentation location is an avatar of the current presenter. As shown in FIG. 3, user A is an identification for the presentation location of the current presenter. The identification (e.g., avatar) and/or direction identification for the current presenter are/is configured to indicate the location of the current presenter such that the following user clearly sees the presentation location of the current presenter in the free-browsing mode.

In one embodiment, a sharer following mode is entered in response to a triggering operation on a following control in the real-time interactive interface by the following user, wherein the real-time interactive interface for the following user presents the same page content as the real-time interactive interface for the current presenter in the sharer following mode.

As shown in FIG. 3, the above following control is set at the top of the real-time interactive interface, and the sharer following mode is performed after the following user clicks the following control. In this way, the free-browsing mode and the following mode may be switched optionally for the following user, increasing the operability of the document.

In one embodiment, in response to a triggering operation on a sharing key in the real-time interactive interface by the following user, a sharer mode is entered, wherein in the sharer mode, the following user obtains a presentation permission to become a current presenter.

As shown in FIG. 3, the above sharing key is set at the top of the real-time interactive interface, and the sharer mode is entered after the user clicks the sharing key. In this way, the following user may quickly obtain the presentation permission to become a presenter, increasing the operability of the document.

S22: A target document address corresponding to a target document link is obtained in response to a first operation on the target document link in the real-time interactive interface, wherein the target document link is embedded in a current document, and the current document is a shared document displayed in the real-time interactive interface.

S23: The current document is presented in the real-time interactive interface, and a target document is displayed based on the target document address.

The steps S22-S23 provided in the embodiment are the same as the steps S11-S12 provided in the above embodiment, which may specifically refer to the description in the above embodiment, and may be not limited in the embodiment.

In the embodiment, the following user may also perform the first operation on the target document link in the real-time interactive interface to jump to a third-party browser after the following user participating in the audio/video conference is in the free-browsing mode. The target document is displayed in a page of the third-party browser based on the target document address.

An embodiment of the present disclosure discloses a page jumping method, including: entering a free-browsing mode in response to a triggering operation on a free-browsing control in a real-time interactive interface, obtaining a target document address corresponding to a target document link in response to a first operation on the target document link, presenting a current document in the real-time interactive interface, and displaying a target document based on the target document address. According to the present disclosure, a user may access the current shared document and the target document at the same time by allowing a sharer and a participator to quickly open a link embedded in the current document by performing a shortcut operation on the target document link in an audio/video conference.

FIG. 5 is a structural schematic diagram of a page jumping apparatus in an embodiment of the present disclosure. The page jumping apparatus provided by the embodiment of the present disclosure may be configured in a client side, or may be configured in a server side. The page jumping apparatus 50 specifically comprises: an operation response module 51 and a page jumping module 52.

The operation response module 51 is configured to obtain, in response to a first operation on a target document link in a real-time interactive interface, a target document address corresponding to the target document link, wherein the target document link is embedded in a current document, and the current document is a shared document displayed in the real-time interactive interface. The page jumping module 52 is configured to present the current document in the real-time interactive interface, and display a target document based on the target document address.

An embodiment of the present disclosure discloses a page jumping apparatus that performs the following steps: obtaining a target document address corresponding to the target document link in response to a first operation on a target document link in a real-time interactive interface, wherein the target document link is embedded in a current document, and the current document is a shared document displayed in the real-time interactive interface; and presenting the current document in the real-time interactive interface, and displaying a target document based on the target document address. According to the technical solution provided by the present disclosure, a user may access the current shared document and the target document at the same time by allowing a sharer and a participator to quickly open a link embedded in the current document by performing a shortcut operation on the target document link in an audio/video conference.

In the embodiment, the page jumping module 52 is configured to display the target document based on the target document address comprises:

jumping to a third-party browser; and displaying the target document in a page of the third-party browser based on the target document address.

In the embodiment, the operation response module 51 is configured to obtain a target document address corresponding to the target document link in response to a triggering operation on a preset control.

In the embodiment, the operation response module 51 is configured to display a first display box in response to a second operation on the target document link; and obtaining a target document address corresponding to the target document link in response to a triggering operation on an open control in the first display box, and performing an operation of displaying the target document based on the target document address.

In the embodiment, the operation response module 51 is configured to obtaining a target document address corresponding to the target document link in response to a triggering operation on a copy control in the first display box.

In the embodiment, the operation response module 51 is configured to determining location information corresponding to the first operation in response to the first operation on the target document link in the real-time interactive interface; and determining a target document address corresponding to the target document link based on the location information.

In the embodiment, the operation response module 51 is configured to enter a free-browsing mode in response to a triggering operation on a free-browsing control in the real-time interactive interface by a following user participating in real-time interaction, wherein in the free-browsing mode, the following user has a browsing operation permission to a shared document presented in the real-time interactive interface independent of a presenter of the current document.

In the embodiment, wherein a real-time interactive interface for the following user presents an identification configured to indicate a presentation location of the current presenter in the free-browsing mode.

In the embodiment, the operation response module 51 is configured to enter a sharer following mode in response to a triggering operation on a following control in the real-time interactive interface by the following user participating in the real-time interaction, wherein the real-time interactive interface for the following user presents the same page content as the real-time interactive interface for the current presenter in the sharer following mode.

In the embodiment, Participating users participating in real-time interaction may obtain the shared content of the shared document by accessing the storage address of the shared document. Here, a shared document can include either the target document and the current document.

The page jump device provided by the present public embodiment may perform the steps performed in the page jump method provided by the present disclosure method embodiment, and the execution steps and beneficial effects will not be repeated herein.

Figure 6:
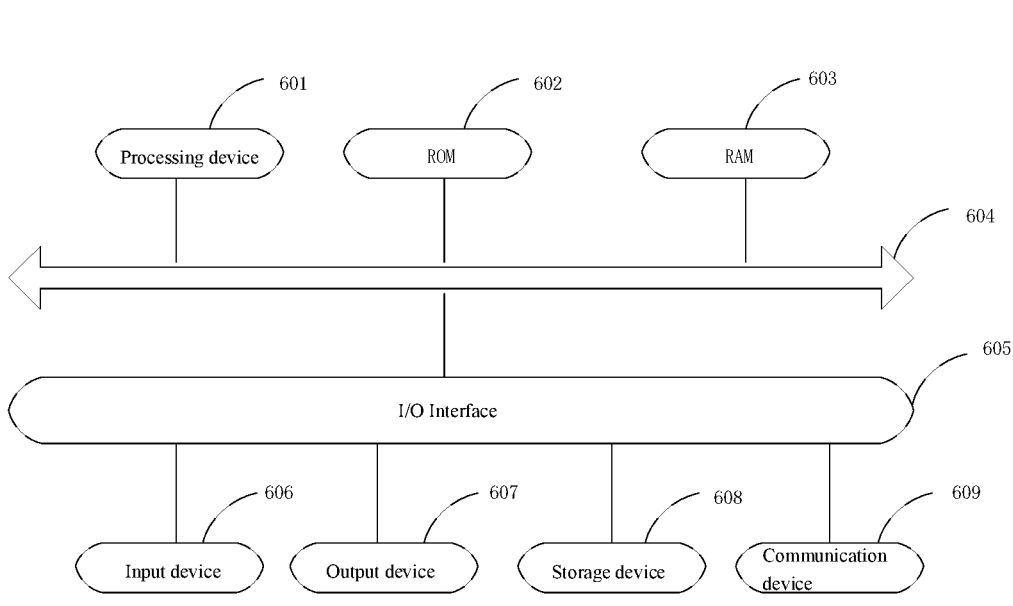
FIG. 6 is a block diagram of a page jumping device in an embodiment of the present disclosure.

FIG. 6 is a block diagram of a page jumping device in an embodiment of the present disclosure. Referring specifically to FIG. 6 now, FIG. 6 shows a structural schematic diagram of a page jumping device 600 configured to implement the embodiments of the present disclosure. The page jumping device 600 in the embodiment of the present disclosure may include, but is not limited to, mobile terminals such as a mobile phone, a notebook computer, a digital broadcast receiver, a PDA (Personal Digital Assistant), a PAD (Tablet Computer), a PMP (Portable Multimedia Player), a vehicle-mounted terminal (e.g., a vehicle-mounted navigation terminal), and a wearable terminal device, and fixed terminals such as a digital TV, a desktop computer, and a smart home device. The terminal device shown in FIG. 6 is merely an example and does not put any limitation to the function and use range of the embodiments of the present disclosure.

As shown in FIG. 6, the terminal device 600 may include a processing device (e.g., a central processing unit, a graphics processing unit, etc.) 601 that may perform various appropriate actions and processing according to a program stored in a read only memory (ROM) 602 or a program loaded from a storage device 608 to a random access memory (RAM) 603 so as to implement the page jumping method in the embodiment of the present disclosure. The RAM 603 stores various programs and data necessary for the operation of the terminal device 600. The processing device 601, the ROM 602 and the RAM 603 are connected to each other by a bus 604. An input/output (I/O) interface 605 is also connected to the bus 604.

In general, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, or the like; a storage device 608 including, for example, a tape, a hard disk, etc.; and a communication device 609. The communication device 609 may allow the terminal device 600 to perform wireless or wired communication with other devices to exchange data. Although FIG. 6 illustrates the terminal device 600 provided with various devices, it should be understood that it is not required to implement or possess all the illustrated devices. More or fewer devices may be implemented or provided alternatively.

Particularly, according to the embodiments of the present disclosure, the process described by referring to the flowchart may be implemented as a computer software program. For example, an embodiment of the present disclosure includes a computer program product including a computer program carried on a computer readable medium, wherein the computer program contains program codes for executing the method shown by the flowchart, thereby implementing the above page jumping method. In such an embodiment, the computer program may be downloaded and installed from the network via the communication device 609, or installed from the storage device 608, or installed from the ROM 602. When the computer program is executed by the processing device 601, the above functions defined in the method of the embodiments of the present disclosure are performed.

It should be noted that the computer-readable medium described in the present disclosure may be a computer-readable signal medium or a computer-readable storage medium, or any combination of the two. Computer-readable storage media may be, for example, —but not limited to—electrical, magnetic, optical, electromagnetic, infrared, or semiconductor systems, devices or devices, or any combination thereof. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical memory devices, magnetic memory devices, or any suitable combination of the foregoing. In the present disclosure, the computer-readable storage medium may be any tangible medium comprising or storing a program, which may be used by an instruction execution system, apparatus or device or used in combination therewith. In the present disclosure, the computer-readable signal medium may include a baseband or a data signal propagated as part of a carrier, which carries computer-readable program code. This propagated data signal may take many forms, including but not limited to electromagnetic signals, optical signals, or any suitable combination of the foregoing. The computer-readable signal medium may also be any computer-readable medium other than the computer-readable storage medium, the computer-readable signal medium may send, propagate, or transmit programs used by or used in combination with the instruction execution system, device or device. Program code contained on computer-readable media may be transmitted on any appropriate medium, including but not limited to: wires, optical cables, RF (radio frequency), etc., or any suitable combination thereof.

In some embodiments, the client, server can communicate using any currently known or future developed network protocol such as HTTP (Hyper Text Transfer Protocol), and may be interconnected with any form or medium of digital data communication (e.g., communication network). Examples of communication networks include local area networks ("LANs"), wide area networks ("WANs"), the Internet (e.g., the Internet), and end-to-end networks (e.g., ad hoc end-to-end networks), as well as any networks currently known or developed in the future.

The above computer-readable medium may be included in the above page jump device; It can also exist alone without being integrated into the page redirection device.

The above computer-readable medium carries one or more programs, when one or more of the above programs are executed by the terminal device, such that the terminal device: in response to the first operation of the target document link in the real-time interactive interface, obtain the target document address corresponding to the target document link, the target document link is embedded in the current document, the current document is a shared document displayed in the real-time interactive interface, the current document is presented in the real-time interactive interface, and based on the target document address, Displays the target document.

Optionally, when one or more of the above programs are executed by the terminal device, the terminal device may also perform other steps described in the above embodiment.

Computer program code may be written in one or more programming languages or combinations thereof to perform the operations of the present disclosure, including, but not limited to, object-oriented programming languages—such as Java, Smalltalk, C++, and also includes general procedural programming languages—such as "C" language or similar programming languages. Program code may be executed entirely on the user's computer, partially on the user's computer, as a stand-alone software package, partly on the user's computer, partially on a remote computer, or completely on a remote computer or server. In the case of a remote computer, the remote computer may be connected to the user's computer through any type of network, including a local area network (LAN) or wide area network (WAN), or may be connected to an external computer (e.g., using an Internet service provider to connect via the Internet).

The flowchart and block diagram in the accompanying drawings illustrating the architecture, functions and operations of the systems, methods and computer program products that may be implemented in accordance with various embodiments of the present disclosure. At this point, each box in the flowchart or block diagram may represent a module, a segment, or a portion of code, the module, segment, or part of code contains one or more executable instructions for implementing a specified logical function. It should also be noted that in some alternative implementations, the functions indicated in the box may also occur in a different order than those indicated in the drawings. For example, two boxes represented consecutively can actually be executed in substantially parallel, and they can sometimes be executed in reverse order, depending on the functionality involved. It should also be noted that each box in the block diagram and/or flowchart, and the combination of boxes in the block diagram and/or flowchart, may be implemented by a dedicated hardware-based system performing a specified function or operation, or may be implemented by a combination of dedicated hardware and computer instructions.

The unit described in the present disclosed embodiment may be implemented by means of software, or by means of hardware. Here, the name of the cell does not in some cases constitute a qualification for the cell itself.

The functions described above in this article may be performed at least in part by one or more hardware logical components. For example, without limitation, the demonstrated type of hardware logic components that can be used include: field programmable gate arrays (FPGAs), application-specific integrated circuits (ASICs), application-specific standard products (ASSPs), system-on-chips (SOCs), complex programmable logic devices (CPLDs), and the like.

In the context of the present disclosure, the machine-readable medium may be a tangible medium which may comprise or store a program for use by or in combination with the instruction execution system, apparatus or device. Machine-readable media can be machine-readable signal media or machine-readable storage media. Machine-readable media may include, but are not limited to, electronic, magnetic, optical, electromagnetic, infrared, or semiconductor systems, devices or devices, or any suitable combination thereof. More specific examples of machine-readable storage media would include electrical connections based on one or more wires, laptop disks, hard disks, random access memory (RAM), read-only memory (ROM), erasable programmable read-only memory (EPROM or flash memory), optical optics, compact disk read-only memory (CD-ROM), optical storage devices, magnetic storage devices, or any suitable combination of the above.

According to one or more embodiments of the present disclosure, the present disclosure provides a page jumping method, comprising:

obtaining a target document address corresponding to a target document link in response to a first operation on the target document link in a real-time interactive interface, wherein the target document link is embedded in a current document, and the current document is a shared document displayed in the real-time interactive interface; and presenting the current document in the real-time interactive interface, and displaying a target document based on the target document address.

In the embodiment, wherein displaying the target document based on the target document address comprises: jumping to a third-party browser; and displaying the target document in a page of the third-party browser based on the target document address.

In the embodiment, wherein obtaining the target document address corresponding to the target document link in response to the first operation on the target document link in the real-time interactive interface comprises: obtaining a target document address corresponding to the target document link in response to a triggering operation on a preset control.

In the embodiment, wherein obtaining the target document address corresponding to the target document link in response to the first operation on the target document link in the real-time interactive interface comprises: displaying a first display box in response to a second operation on the target document link; and obtaining a target document address corresponding to the target document link in response to a triggering operation on an open control in the first display box, and performing an operation of displaying the target document based on the target document address.

In the embodiment, further comprising: obtaining a target document address corresponding to the target document link in response to a triggering operation on a copy control in the first display box.

In the embodiment, wherein obtaining the target document address corresponding to the target document link in response to the first operation on the target document link in the real-time interactive interface comprises: determining location information corresponding to the first operation in response to the first operation on the target document link in the real-time interactive interface; and determining a target document address corresponding to the target document link based on the location information.

In the embodiment, before in response to the first operation on the target document link in the real-time interactive interface, further comprising: entering a free-browsing mode in response to a triggering operation on a free-browsing control in the real-time interactive interface by a following user participating in real-time interaction, wherein in the free-browsing mode, the following user has a browsing operation permission to a shared document presented in the real-time interactive interface independent of a presenter of the current document.

In the embodiment, wherein a real-time interactive interface for the following user presents an identification configured to indicate a presentation location of the current presenter in the free-browsing mode.

In the embodiment, after entering the free-browsing mode in response to the triggering operation on the free-browsing control in the real-time interactive interface by the following user participating in the real-time interaction, further comprising: entering a sharer following mode in response to a triggering operation on a following control in the real-time interactive interface by the following user participating in the real-time interaction, wherein the real-time interactive interface for the following user presents the same page content as the real-time interactive interface for the current presenter in the sharer following mode.

In the embodiment, wherein users participating in the real-time interaction obtain shared content of the shared document by accessing a storage address of the shared document, and the shared document comprises any one of the target document and the current document.

In the embodiment, a page jumping apparatus, comprising: an operation response module, configured to obtain a target document address corresponding to a target document link in response to a first operation on the target document link, wherein the target document link is embedded in a current document, and the current document is a shared document displayed in the real-time interactive interface; and a page jumping module, configured to present the current document in the real-time interactive interface, and display a target document based on the target document address.

In the embodiment, a page jumping module configured to jumping to a third-party browser; and displaying the target document in a page of the third-party browser based on the target document address.

In the embodiment, a page jumping apparatus configured to obtaining a target document address corresponding to the target document link in response to a triggering operation on a preset control.

In the embodiment, a page jumping apparatus configured to displaying a first display box in response to a second operation on the target document link; and obtaining a target document address corresponding to the target document link in response to a triggering operation on an open control in the first display box, and performing an operation of displaying the target document based on the target document address.

In the embodiment, a page jumping apparatus configured to obtaining a target document address corresponding to the target document link in response to a triggering operation on a copy control in the first display box.

In the embodiment, a page jumping apparatus configured to determining location information corresponding to the first operation in response to the first operation on the target document link in the real-time interactive interface; and determining a target document address corresponding to the target document link based on the location information.

In the embodiment, a page jumping apparatus configured to entering a free-browsing mode in response to a triggering operation on a free-browsing control in the real-time interactive interface by a following user participating in real-time interaction, wherein in the free-browsing mode, the following user has a browsing operation permission to a shared document presented in the real-time interactive interface independent of a presenter of the current document.

In the embodiment, wherein a real-time interactive interface for the following user presents an identification configured to indicate a presentation location of the current presenter in the free-browsing mode.

In the embodiment, a page jumping apparatus configured to entering a sharer following mode in response to a triggering operation on a following control in the real-time interactive interface by the following user participating in the real-time interaction, wherein the real-time interactive interface for the following user presents the same page content as the real-time interactive interface for the current presenter in the sharer following mode.

According to one or more embodiments of the present disclosure, the present disclosure provides a page redirection device, comprising:

one or more processors;

memory, which stores one or more programs;

When the program or programs are executed by one or more processors, such that the processor or processors implement any of the page jump methods provided herein.

According to one or more embodiments of the present disclosure, the present disclosure provides a computer-readable storage medium on which a computer program is stored, the program is executed by the processor when implemented as in any of the page jump methods provided in the present disclosure.

The present disclosed embodiment also provides a computer program product, the computer program product includes a computer program or instruction, the computer program or instruction is executed by the processor when implemented as described above page jump method.

The above description is only a better embodiment of the present disclosure and a description of the technical principles used. Those skilled in the art should understand that the scope of disclosure involved in the present disclosure is not limited to a particular combination of the above technical features, but should also cover other technical solutions formed by any combination of the above technical features or their equivalents without departing from the above disclosure ideas. For example, the above features and the technical features disclosed in the present disclosure (but not limited to) technical features with similar functions are substituted to form a technical solution.

In addition, although operations are depicted in a particular order, this should not be understood as requiring them to be performed in the specific order indicated or in sequential order. In certain circumstances, multitasking and parallel processing can be advantageous. Similarly, although a number of specific implementation details are included in the foregoing, these should not be interpreted as limiting the scope of the present disclosure. Certain features described in the context of a separate embodiment may also be combined to be implemented in a single embodiment. Conversely, the various features described in the context of a single embodiment may also be implemented individually or in any suitable combination in a plurality of embodiments.

Although the subject matter has been described in language specific to structural features and/or method logical actions, it should be understood that the subject matter defined in the appended claims is not necessarily limited to the specific features or actions described above. On the contrary, the specific features and actions described above are only exemplary forms of realization of the claims.

What is claimed is:

1. A method of displaying documents during a real-time communication, comprising:

displaying a current document in a real-time interactive interface of the real-time communication, wherein the current document is a document shared by a sharer with other participants in the real-time communication, wherein a target document link is embedded in the current document, and wherein the target document link corresponds to a target document;

presetting a shortcut operation associated with the target document link, the shortcut operation enabling any participant in the real-time communication to open the target document in the real-time interactive interface without through a third-party browser;

receiving a first operation on the target document link in the real-time interactive interface performed by any participant in the real-time communication, wherein the participant comprises the sharer who shares the current document in the real-time interactive interface and any other participant in the real-time communication through the real-time interactive interface;

determining location information of the target document link in the real-time interactive interface in response to receiving the first operation on the target document link;

determining a target document address corresponding to the target document link based on the location information of the target document link in the real-time interactive interface by querying a prestored corresponding relationship between the location information and the target document address; and simultaneously displaying, in the real-time interactive interface, the target document based on the target document address while displaying the current document in the real-time interactive interface in response to the first operation on the target document link performed by any participant in the real-time communication, wherein the target document is not displayed through the third-party browser.

2. The method according to claim 1, further comprising:

displaying the target document based on a target document address;

jumping to a browser; and displaying the target document in a page of the browser based on the target document address.

3. The method according to claim 1, further comprising:

obtaining a target document address corresponding to the target document link in response to the first operation on the target document link in the real-time interactive interface, wherein the obtaining a target document address corresponding to the target document link in response to the first operation on the target document link in the real-time interactive interface further comprises obtaining the target document address corresponding to the target document link in response to a triggering operation on a preset control.

4. The method according to claim 1, further comprising:

obtaining a target document address corresponding to the target document link in response to the first operation on the target document link in the real-time interactive interface, wherein the obtaining a target document address corresponding to the target document link in response to the first operation on the target document link in the real-time interactive interface further comprises:

displaying a first display box in response to a second operation on the target document link, and obtaining the target document address corresponding to the target document link in response to a triggering operation on an open control in the first display box, and performing an operation of displaying the target document based on the target document address.

5. The method according to claim 4, further comprising:

obtaining the target document address corresponding to the target document link in response to a triggering operation on a copy control in the first display box.

6. The method according to claim 1, further comprising:
obtaining a target document address corresponding to the target document link in response to the first operation on the target document link in the real-time interactive interface, wherein the obtaining a target document address corresponding to the target document link in response to the first operation on the target document link in the real-time interactive interface further comprises:
determining location information corresponding to the first operation in response to the first operation on the target document link in the real-time interactive interface; and
determining the target document address corresponding to the target document link based on the location information.

7. The method according to claim 1, before in response to the first operation on the target document link in the real-time interactive interface, further comprising:
entering a free-browsing mode in response to a triggering operation on a free-browsing control in the real-time interactive interface by a following user participating in real-time interaction, wherein in the free-browsing mode, the following user has a browsing operation permission to a shared document presented in the real-time interactive interface independent of a presenter of the current document.

8. The method according to claim 7, wherein a real-time interactive interface for the following user presents an identification configured to indicate a presentation location of the current presenter in the free-browsing mode.

9. The method according to claim 7, after entering the free-browsing mode in response to the triggering operation on the free-browsing control in the real-time interactive interface by the following user participating in the real-time interaction, further comprising:
entering a sharer following mode in response to a triggering operation on a following control in the real-time interactive interface by the following user participating in the real-time interaction, wherein the real-time interactive interface for the following user presents the same page content as the real-time interactive interface for the current presenter in the sharer following mode.

10. The method according to claim 1, further comprising:
accessing a storage address of a shared document to obtain shared content of the shared document by users participating in the real-time communication, and wherein the shared document comprises any one of the target document and the current document.

11. A device of displaying documents during a real-time communication, wherein the device comprises:
one or more processors; and a storage device, configured to store one or more programs; wherein the one or more programs, when executed by the one or more processors, cause the one or more processors to implement operations comprising:
displaying a current document in a real-time interactive interface of the real-time communication, wherein the current document is a document shared by a sharer with other participants in the real-time communication, wherein a target document link is embedded in the current document, and wherein the target document link corresponds to a target document;
presetting a shortcut operation associated with the target document link, the shortcut operation enabling any participant in the real-time communication to open the target document in the real-time interactive interface without through a third-party browser;
receiving a first operation on the target document link in the real-time interactive interface performed by any participant in the real-time communication, wherein the participant comprises the sharer who shares the current document in the real-time interactive interface and any other participant in the real-time communication through the real-time interactive interface;
determining location information of the target document link in the real-time interactive interface in response to receiving the first operation on the target document link;
determining a target document address corresponding to the target document link based on the location information of the target document link in the real-time interactive interface by querying a prestored corresponding relationship between the location information and the target document address; and
simultaneously displaying, in the real-time interactive interface, the target document based on the target document address while displaying the current document in the real-time interactive interface in response to the first operation on the target document link performed by any participant in the real-time communication, wherein the target document is not displayed through the third-party browser.

12. A non-transitory computer-readable storage medium, storing a computer program thereon, wherein the program, when executed by a processor, cause the processor to implement operations comprising:
displaying a current document in a real-time interactive interface of the real-time communication, wherein the current document is a document shared by a sharer with other participants in the real-time communication, wherein a target document link is embedded in the current document, and wherein the target document link corresponds to a target document;
presetting a shortcut operation associated with the target document link, the shortcut operation enabling any participant in the real-time communication to open the target document in the real-time interactive interface without through a third-party browser;
receiving a first operation on the target document link in the real-time interactive interface performed by any participant in the real-time communication, wherein the participant comprises the sharer who shares the current document in the real-time interactive interface and any other participant in the real-time communication through the real-time interactive interface;
determining location information of the target document link in the real-time interactive interface in response to receiving the first operation on the target document link;
determining a target document address corresponding to the target document link based on the location information of the target document link in the real-time interactive interface by querying a prestored corresponding relationship between the location information and the target document address; and
simultaneously displaying, in the real-time interactive interface, the target document based on the target document address while displaying the current document in the real-time interactive interface in response to the first operation on the target document link performed by any participant in the real-time communication, wherein the target document is not displayed through the third-party browser.

13. The non-transitory computer-readable storage medium according to claim 12, the operations further comprising:

displaying the target document based on a target document address;

jumping to a browser; and displaying the target document in a page of the browser based on the target document address.

14. The non-transitory computer-readable storage medium according to claim 12, the operations further comprising:

obtaining a target document address corresponding to the target document link in response to the first operation on the target document link in the real-time interactive interface, wherein the obtaining a target document address corresponding to the target document link in response to the first operation on the target document link in the real-time interactive interface further comprises obtaining the target document address corresponding to the target document link in response to a triggering operation on a preset control.

15. The non-transitory computer-readable storage medium according to claim 12, the operations further comprising:

obtaining a target document address corresponding to the target document link in response to the first operation on the target document link in the real-time interactive interface, wherein the obtaining a target document address corresponding to the target document link in response to the first operation on the target document link in the real-time interactive interface further comprises:

displaying a first display box in response to a second operation on the target document link, and obtaining the target document address corresponding to the target document link in response to a triggering operation on an open control in the first display box, and performing an operation of displaying the target document based on the target document address.

16. The non-transitory computer-readable storage medium according to claim 12, wherein the operations further comprise:

obtaining the target document address corresponding to the target document link in response to a triggering operation on a copy control in a first display box.

17. The non-transitory computer-readable storage medium according to claim 12, the operations further comprising:

obtaining a target document address corresponding to the target document link in response to the first operation on the target document link in the real-time interactive interface, wherein the obtaining a target document address corresponding to the target document link in response to the first operation on the target document link in the real-time interactive interface further comprises:

determining location information corresponding to the first operation in response to the first operation on the target document link in the real-time interactive interface; and determining the target document address corresponding to the target document link based on the location information.

18. The non-transitory computer-readable storage medium according to claim 12, wherein before in response to the first operation on the target document link in the real-time interactive interface, the operations further comprise:

entering a free-browsing mode in response to a triggering operation on a free-browsing control in the real-time interactive interface by a following user participating in real-time interaction, wherein in the free-browsing mode, the following user has a browsing operation permission to a shared document presented in the real-time interactive interface independent of a presenter of the current document.

19. The non-transitory computer-readable storage medium according to claim 18, wherein a real-time interactive interface for the following user presents an identification configured to indicate a presentation location of the current presenter in the free-browsing mode.

20. The non-transitory computer-readable storage medium according to claim 18, wherein after entering the free-browsing mode in response to the triggering operation on the free-browsing control in the real-time interactive interface by the following user participating in the real-time interaction, the operations further comprise:

entering a sharer following mode in response to a triggering operation on a following control in the real-time interactive interface by the following user participating in the real-time interaction, wherein the real-time interactive interface for the following user presents the same page content as the real-time interactive interface for the current presenter in the sharer following mode.

* * * * *